(12) United States Patent
Negi et al.

(10) Patent No.: US 8,591,765 B2
(45) Date of Patent: Nov. 26, 2013

(54) NEGATIVE ELECTRODE MATERIAL FOR NONAQUEOUS ELECTROLYTE SECONDARY BATTERIES AND MANUFACTURING METHOD THEREOF

(75) Inventors: Noriyuki Negi, Osaka (JP); Tatsuo Nagata, Osaka (JP); Akihiko Saguchi, Tokyo (JP)

(73) Assignees: Nippon Steel & Sumitomo Metal Corporation, Tokyo (JP); Chuo Denki Kogyo Co., Ltd., Niigata (JP)

( * ) Notice: Subject to any disclaimer, the term of this patent is extended or adjusted under 35 U.S.C. 154(b) by 0 days.

(21) Appl. No.: 13/531,930

(22) Filed: Jun. 25, 2012

(65) Prior Publication Data

US 2012/0305834 A1 Dec. 6, 2012

Related U.S. Application Data

(63) Continuation of application No. PCT/JP2010/073393, filed on Dec. 24, 2010.

(30) Foreign Application Priority Data

Dec. 25, 2009 (JP) ................................. 2009-294902

(51) Int. Cl.
   *H01M 4/88* (2006.01)
(52) U.S. Cl.
   USPC .................... 252/182.1; 423/448; 429/218.1; 429/231.8; 429/231.95

(58) Field of Classification Search
   USPC ............ 252/182.1, 500; 423/448; 429/231.8, 429/218.1, 231.95
   See application file for complete search history.

(56) References Cited

U.S. PATENT DOCUMENTS

| 2004/0029004 A1 | 2/2004 | Miyaki |
| 2005/0181276 A1 | 8/2005 | Miyaki |

FOREIGN PATENT DOCUMENTS

| JP | 2003031211 A | 1/2003 | |
| JP | 2008-066025 | * 3/2008 | ............. H01M 4/38 |
| JP | 2008066025 A | 3/2008 | |
| JP | 2009048824 A | 3/2009 | |

* cited by examiner

*Primary Examiner* — Khanh Tuan Nguyen
(74) *Attorney, Agent, or Firm* — The Webb Law Firm

(57) ABSTRACT

The present invention provides a negative electrode material for a nonaqueous electrolyte secondary battery which can improve the cycle properties of a lithium ion secondary battery and a method for manufacturing the negative electrode material. The negative electrode material comprises at least two types of powdery alloy materials A and B in which powdery alloy material A contains Co, Sn, and Fe and does not contain Ti and powdery alloy material B contains Fe, Ti, and Sn, and the proportion of the mass of powdery alloy material B to the sum of the mass of powdery alloy material A and the mass of powdery alloy material B is at least 10 mass % and at most 30 mass %.

2 Claims, 1 Drawing Sheet

$2\theta$

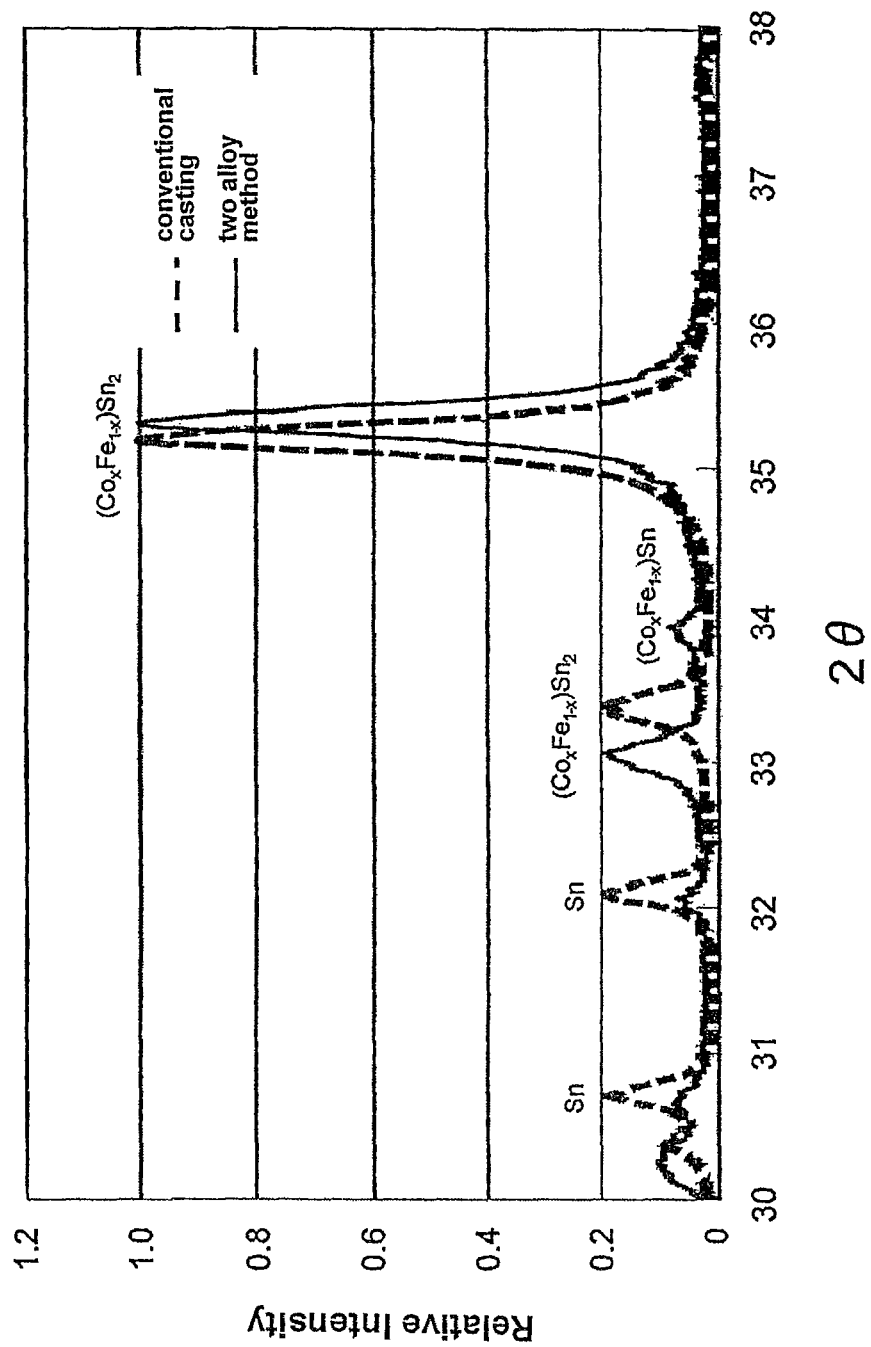

NEGATIVE ELECTRODE MATERIAL FOR NONAQUEOUS ELECTROLYTE SECONDARY BATTERIES AND MANUFACTURING METHOD THEREOF

CROSS-REFERENCE TO RELATED APPLICATIONS

This application is a continuation of International Patent Application Number PCT/JP2010/073393 filed Dec. 24, 2010, entitled "Negative Electrode Material for a Nonaqueous Electrolyte Secondary Battery and a Method for its Manufacture" and designating, inter alia, the United States, which claims priority to Japanese Patent Application Serial No. 2009-294902, filed Dec. 24, 2009.

TECHNICAL FIELD

This invention relates to a negative electrode material for a nonaqueous electrolyte secondary battery and a manufacturing method thereof, and particularly to a negative electrode material for a lithium ion secondary battery and a manufacturing method thereof.

BACKGROUND ART

In a lithium ion secondary battery using a Sn alloy as an active material for a negative electrode, the Sn alloy repeatedly expands and contracts caused by repeated charge and discharge. This repeated expansion and contraction results in the problem that the cycle properties of the lithium ion secondary battery worsen.

Patent Document 1 discloses a negative electrode material for a nonaqueous electrolyte secondary battery containing an intermetallic compound based on Co, Sn, and the like and a method for the manufacture thereof. Patent Document 2 discloses a negative electrode material for a nonaqueous electrolyte secondary battery using Co, Sn, and Ti and a method for the manufacture thereof in which an alloy material A which is a mixture of intermetallic compounds based on CoSn and $CoSn_2$ and an alloy material B which is an intermetallic compound of the formula: $Co_xTi_ySn$ are separately prepared by the rapid solidification process and these two materials are mixed in a predetermined proportion. That document states that by so doing, it is possible to suppress precipitation of a Sn phase and to improve the cycle properties of a nonaqueous electrolyte secondary battery.

PRIOR ART DOCUMENTS

Patent Documents

Patent Document 1: JP 2003-31211 A
Patent Document 2: JP 2008-66025 A

DISCLOSURE OF THE INVENTION

It is an object of the present invention to provide a negative electrode material for a nonaqueous electrolyte secondary battery which can improve the cycle properties of a lithium ion secondary battery and a method for manufacturing the negative electrode material. Another object of the present invention is to provide an inexpensive negative electrode material for a nonaqueous electrolyte secondary battery by suppressing the amount of expensive Co which is used and a manufacturing method thereof.

A negative electrode material for a nonaqueous electrolyte secondary battery according to the present invention is characterized in that it comprises at least two types of powdery alloy materials A and B in which powdery alloy material A contains Co, Sn, and Fe and does not contain Ti and powdery alloy material B contains Fe, Ti, and Sn, and that the proportion of the mass of powdery alloy material B to the sum of the mass of powdery alloy material A and the mass of powdery alloy material B is at least 10 mass % and at most 30 mass %.

A method of manufacturing a negative electrode material for a nonaqueous electrolyte secondary battery according to the present invention is characterized by having a step of preparing a powdery alloy material A which contains Co, Sn, and Fe and does not contain Ti, a step of preparing a powdery alloy material B which contains Fe, Ti, and Sn, and a step of mixing at least powdery alloy material A and powdery alloy material B such that the proportion of the mass of powdery alloy material B to the sum of the mass of powdery alloy material A and the mass of powdery alloy material B is at least 10 mass % and at most 30 mass %.

In accordance with the present invention, an alloy which contains Fe but does not contain Ti and an alloy which contains Fe and Ti are separately prepared and then mixed together. Therefore, it is realized to provide a negative electrode material having a high capacity and excellent cycle properties while suppressing the amount of expensive Co which is used.

BRIEF EXPLANATION OF THE DRAWINGS

FIG. 1 is a graph explaining the measured results by X-ray powder diffraction of a negative electrode material according to an embodiment of the present invention and a negative electrode material according to the prior art.

MODES FOR CARRYING OUT THE INVENTION

Embodiments of the present invention will be explained below in detail with reference to the drawing. The shape, dimensions, temperatures, numerical values, and the like which are explained below are by way of example for illustration and can be suitably varied.

The negative electrode material for a nonaqueous electrolyte secondary battery which is described below is typically prepared by carrying out melting of raw material metals, casting of the melt, pulverization and size regulation, and mixing. This negative electrode material can be used as it is as a negative electrode material for a lithium ion secondary battery. However, preferably a carbon material such as graphite powder is added to the negative electrode material and then subjected to mechanical treatment such as mechanical grinding, and the resulting material is used as a negative electrode active material for a nonaqueous electrolyte secondary battery.

The negative electrode material according to the present invention comprises at least two types of powdery alloy materials. These two types of powdery alloy materials are referred to below as powdery alloy material A and powdery alloy material B. In addition to powdery alloy material A and powdery alloy material B, the negative electrode material may further contain suitable amounts of other substances. Examples of such substances are carbon (natural graphite, artificial graphite, hard carbon, and the like), and active materials other than Co and Fe (such as Si or intermetallic compounds such as CoSn). The total amounts of each elements constituting powdery alloy material A and powdery alloy material B are preferably 5≤Co≤15 mass %, 5≤Fe≤15 mass %, 65≤Sn≤80 mass %, 0<Ti≤2 mass %, 0≤Ag<2.5 mass %, and 0≤Cu<2.5 mass %.

Powdery alloy material A contains Co, Sn, and Fe and does not contain Ti. Powdery alloy material A is typically prepared by carrying out melting of the raw material metals, casting, and pulverization and size regulation. The casting is preferably carried out by rapid solidification. Powdery alloy material A contains Co, Sn, and Fe, so it does not significantly decrease the capacity of a battery, and it suppresses the amount of expensive Co which is used. If powdery alloy material A contains Ti, $Co_2TiSn$ will precipitate and the capacity of a battery will decrease. Namely, in the present invention, the statement that powdery alloy material A "does not contain Ti" means that the content of Ti in powdery alloy material A is decreased to the extent that powdery alloy material A has substantially no precipitation of $Co_2TiSn$. Powdery alloy material A which "does not contain Ti" has $CoSn_2$, CoSn, $FeSn_2$, and FeSn as main constituents. These constituents contain Co and Sn, so they have a high capacity.

Powdery alloy material B contains Fe, Ti, and Sn. Powdery alloy material B is typically prepared by carrying out melting, casting, and pulverization and size regulation. In the case of powdery alloy material B as well, casting is preferably carried out by rapid solidification. If powdery alloy material B contains Co, the cycle properties of a negative electrode material as a whole are deteriorated. Accordingly, powdery alloy material B preferably contains as little Co as possible.

Powdery alloy material A and powdery alloy material B may contain, as impurities, elements such as Ti and Co which are unavoidably incorporated from raw materials or during manufacturing steps.

The ratio of powdery alloy material A and powdery alloy material B in the negative electrode material is such that the proportion of the mass of powdery alloy material B to the sum of the mass of powdery alloy material A and the mass of powdery alloy material B (referred to below as the B ratio) is at least 10 mass % to at most 30 mass %.

The reasons for setting this proportion as described above are as follows. As stated above, powdery alloy material A has a high capacity since it contains Co and Sn. However, when charge and discharge of a battery containing powdery alloy material A are repeated, powdery alloy material A repeatedly expands and contracts and becomes a fine powder. The cycle properties of powdery alloy material A which has become a fine powder become poor. On the other hand, as stated below, powdery alloy material B has a low capacity since it is based on FeTiSn. By having this low capacity phase (a phase based on powdery alloy material B) coexisting with a high capacity phase (a phase based on powdery alloy material A) in a negative electrode material, stresses caused by changes in the volume of the high capacity phase due to repeated charge and discharge are alleviated, and pulverization of powdery alloy material A is suppressed. As a result, the negative electrode material has good cycle properties. Namely, by forming a negative electrode material in which powdery alloy material A and powdery alloy material B coexist, it is possible to obtain a negative electrode material having a high capacity and improved cycle properties.

However, if the B ratio is too low, it will become difficult to adequately absorb and alleviate stresses produced in powdery alloy material A, and the effect of improving cycle properties is reduced. Accordingly, the B ratio is made at least 10 mass %. On the other hand, if the B ratio is too high, the capacity of the overall electrode material will be decreased, and this results in a decrease in the discharge capacity of a battery. Accordingly, the B ratio is made at most 30 mass %. By making the B ratio at least 10 mass % to at most 30 mass %, the above-described effect of having phases of different capacities coexisting can be stably obtained while minimizing a decrease in capacity.

Powdery alloy material A may contain Ag and Cu in addition to Co, Sn, and Fe. For example, the composition of powdery alloy material A as a mass ratio can be Co:Fe:Sn:Ag:Cu=13.9:5.7:75.6:2.4:2.4.

Powdery alloy material B comprises Fe, Ti, and Sn. Preferably powdery alloy material B is made so as to contain a large amount of FeTiSn. More preferably, powdery alloy material B consists essentially of FeTiSn. For example, the composition of powdery alloy material B as a mass ratio can be Fe:Sn:Ti=25.1:53.4:21.5. When the negative electrode material contains Co, preferably all of the Co is present in powdery alloy material A. Namely, powdery alloy material B preferably does not contain Co.

Powdery alloy material A and powdery alloy material B are typically prepared by melting, casting by rapid solidification, and pulverization and size regulation.

Melting may be carried out heating granular alloy raw materials which have been placed into a melting crucible under a non-oxidizing atmosphere to completely melt them.

The melting crucible which is used can be a crucible which has heat resistance at the melting temperature of the alloy raw materials and which has an inner surface formed of a material which does not react with the alloy raw materials. For example, it is preferable to use a melting crucible made of alumina for preparing powdery alloy material A and to use a melting crucible made of graphite for preparing powdery alloy material B. A inciting crucible made of alumina is less expensive than a melting crucible made of graphite. Therefore, using a melting crucible made of alumina is preferable from the standpoint of inexpensively preparing a negative electrode material. However, with an alloy containing a large amount of Ti, which has a high melting point, it is necessary to reach a particularly high temperature to obtain a melt. As a result, there is the concern that an alumina crucible partially or entirely reacts with the melt, resulting in a reduction in the wall thickness of the crucible. In addition, when Ti and Sn coexist, at a high temperature which is necessary for melting Ti, the melt may penetrate into pores of the alumina crucible due to the properties of molten Sn (having a high wetting force), thereby accelerating reactions between the crucible and the melt. Accordingly, for material B which contains Ti, it is preferable to use a graphite crucible.

As a heating method for melting, high-frequency induction heating may be used. Other suitable heating methods such as Ar arc heating and electron beam heating may also be used. The atmosphere for melting is preferably non-oxidizing. Specific examples are melting in a nitrogen, helium, or argon atmosphere, or melting in a vacuum. It is particularly preferable to melt in an argon atmosphere.

Rapid solidification is typically carried out by the strip casting method. In the strip casting method, a molten material is poured through a slit provided in the bottom of a tundish onto a rotating water-cooled roll, thereby rapidly cooling and solidifying the molten material in a continuous manner. Other methods such as the melt spinning method, the twin roll rapid cooling method, the gas atomizing method, or the water atomizing method may also be used. Instead of melting, casting, pulverizing, and size regulation, it is possible to mechanically prepare an alloy from alloy raw materials using the mechanical alloying method or the like.

When casting is performed using rapid cooling on a roll such as the above-described strip casting method, the melt spinning method, or the twin roll rapid cooling method, an alloy in the form of flakes is formed. This alloy flakes are then pulverized using a ball mill or the like. After pulverization, the resulting powder may be classified using a sieve having openings of a suitable size for the purpose of size regulation. When using the gas atomizing method, the water atomizing method, or the mechanical alloying method, a powder-shaped alloy is formed, and subsequent pulverization is unnecessary.

In this manner, a powdery alloy material A having $CoSn_2$, CoSn, $FeSn_2$, and FeSn as main constituents and a powdery alloy material B having FeTiSn as a main constituent are obtained. The resulting powdery alloy material A and powdery alloy material B are mixed using a ball mill, a blender, or the like to obtain a negative electrode material according to the present invention.

EXAMPLES

Below, the present invention will be explained more specifically by examples and comparative examples. These examples are not intended to limit the present invention.

Comparative Example 1

Alloy raw materials which were mixed to give a Co:Fe:Sn:Ti:Ag:Cu mass ratio of 10.7:10.1:70.6:5.0:1.8:1.8 were placed into a melting crucible made of alumina and were heated to 1550° C. in an Ar atmosphere by high-frequency induction heating to completely melt them. The resulting melt was then subjected to rapid solidification by the strip casting method using a water-cooled copper roll rotating at a peripheral speed of 90 meters per minute to obtain a cast product in the form of flakes. The cooling rate in this method was approximately 5000° C. per second. This cast product was pulverized using a ball mill to obtain a negative electrode material. The duration of pulverization was set so that nearly the entirety of the cast product after pulverization could pass through a sieve with openings measuring 45 micrometers.

Comparative Example 2

Alloy raw materials which were mixed to give a Co:Fe:Sn:Ti:Ag:Cu mass ratio of 10.5:9.9:72.3:3.7:1.8:1.8 were placed into a melting crucible made of alumina and were heated to 1550° C. in an Ar atmosphere by high-frequency induction heating to completely melt them. The resulting melt was then subjected to rapid solidification by the strip casting method using a water-cooled copper roll rotating at a peripheral speed of 90 meters per minute to obtain a cast product in the form of flakes. The cooling rate in this method was approximately 5000° C. per second. This cast product was pulverized using a ball mill to obtain a negative electrode material. The duration of pulverization was set so that nearly the entirety of the cast product after pulverization could pass through a sieve with openings measuring 45 micrometers.

Comparative Example 3

Alloy raw materials which were mixed to give a Co:Fe:Sn:Ag:Cu mass ratio of 10.8:7.9:76.5:2.4:2.4 were placed into a melting crucible made of alumina and were heated by high-frequency induction heating to 1400° C. in an Ar atmosphere to completely melt them. The resulting melt was then subjected to rapid solidification by the strip casting method using a water-cooled copper roll rotating at a peripheral speed of 90 meters per minute to obtain a cast product in the form of flakes. The cooling rate in this method was approximately 5000° C. per second. The cast product was pulverized using a ball mill to obtain powdery alloy material A. The duration of pulverization was set so that substantially the entire cast product after pulverization could pass through a sieve with openings measuring 45 micrometers.

Separately, alloy raw materials which were mixed to give a Fe:Sn:Ti mass ratio of 25.1:53.4:21.5 were placed into a melting crucible made of carbon and were completely melted by high-frequency induction heating to 1550° C. in an Ar atmosphere. The resulting melt was then subjected to rapid solidification by the strip casting method using a water-cooled copper roll rotating at a peripheral speed of 90 meters per minute to obtain a cast product in the form of a thin foil. The cooling rate in this method was approximately 5000° C. per second. The cast product was pulverized using a ball mill to obtain powdery alloy material B. The duration of pulverization was set so that substantially the entire cast product after pulverization could pass through a sieve with openings measuring 45 micrometers.

The above-described powdery alloy material A and powdery alloy material B were weighed out so that the mass ratio of powdery alloy material A to powdery alloy material B was 92.1:7.9, then they were placed into a ball mill vessel having an inner diameter of 120 mm and mixed for 2 hours at 90 rpm therein to obtain a negative electrode material. The composition of the resulting negative electrode material expressed as a mass ratio of Co:Fe:Sn:Ti:Ag:Cu was 9.9:9.3:74.7:1.7:2.2:2.2.

Example 1

Alloy raw materials which were mixed to give a Co:Fe:Sn:Ag:Cu mass ratio of 13.9:5.7:75.6:2.4:2.4 were formed into a cast product in the form of flakes under the same conditions as for powdery alloy material A in Comparative Example 3. This cast product was pulverized using a ball mill to obtain powdery alloy material A. The duration of pulverization was set so that substantially the entirety of the cast product after pulverization could pass through a sieve with openings measuring 45 micrometers.

Alloy raw materials which were mixed to give a Fe:Sn:Ti mass ratio of 25.1:53.4:21.5 were formed into a cast product in the form of flakes under the same conditions as for powdery alloy material B in Comparative Example 3. This cast product was pulverized using a ball mill to obtain powdery alloy material B. The duration of pulverization was set so that substantially the entirety of the cast product after pulverization could pass through a sieve with openings measuring 45 micrometers.

The above-described powdery alloy material A and powdery alloy material B were weighed out so that the mass ratio of powdery alloy material A to powdery alloy material B was 76.9:23.1, then they were placed into a ball mill vessel having an inner diameter of 120 mm and processed therein for 2 hours at 90 rpm to obtain a negative electrode material. The composition of the resulting negative electrode material expressed as a mass ratio of Co:Fe:Sn:Ti:Ag:Cu was 10.7:10.1:70.5:4.9:1.9:1.9. This composition ratio was nearly the same as for Comparative Example 1.

Example 2

Alloy raw materials which were mixed to give a Co:Fe:Sn:Ag:Cu mass ratio of 12.7:6.7:76.2:2.2:2.2 were formed into a cast product in the form of flakes under the same conditions as for powdery alloy material A in Comparative Example 3. This cast product was pulverized using a ball mill to obtain powdery alloy material A. The duration of pulverization was set so that substantially the entirety of the cast product after pulverization could pass through a sieve with openings measuring 45 micrometers.

Alloy raw materials which were mixed to give a Fe:Sn:Ti mass ratio of 25.1:53.4:21.5 were formed into a cast product in the form of flakes under the same conditions as for powdery alloy material B in Comparative Example 3. This cast product was pulverized using a ball mill to obtain powdery alloy material B. The duration of pulverization was set so that substantially the entirety of the cast product after pulverization could pass through a sieve with openings measuring 45 micrometers.

The above-described powdery alloy material A and powdery alloy material B were weighed out so that the mass ratio of powdery alloy material A to powdery alloy material B was 82.9:17.1, then they were placed into a ball mill vessel having an inner diameter of 120 mm and processed therein for mixing for 2 hours at 90 rpm to obtain a negative electrode material in the form of a mixed powder. The composition of the resulting negative electrode material expressed as a mass ratio of Co:Fe:Sn:Ti:Ag:Cu was 10.5:9.9:72.3:3.7:1.8:1.8. This composition ratio was nearly the same as for Comparative Example 2.

Example 3

Alloy raw materials which were mixed to give a Co:Fe:Sn:Ag:Cu mass ratio of 12.7:4.1:78.2:2.5:2.5 were formed into a cast product in the form of flakes under the same conditions as for powdery alloy material A in Comparative Example 3. This cast product was pulverized using a ball mill to obtain powdery alloy material A. The duration of pulverization was set so that substantially the entirety of the cast product after pulverization could pass through a sieve with openings measuring 45 micrometers.

Alloy raw materials which were mixed to give a Fe:Sn:Ti mass ratio of 25.1:53.4:21.5 were formed into a cast product in the form of flakes under the same conditions as for powdery alloy material B in Comparative Example 3. This cast product was pulverized using a ball mill to obtain powdery alloy material B. The duration of pulverization was set so that substantially the entirety of the cast product after pulverization could pass through a sieve with openings measuring 45 micrometers.

The above-described powdery alloy material A and powdery alloy material B were weighed out so that the mass ratio of powdery alloy material A to powdery alloy material B was 76.3:23.7, then they were placed into a ball mill vessel having an inner diameter of 120 mm and processed therein for mixing for 2 hours at 90 rpm to obtain a negative electrode material in the form of a mixed powder. The composition of the resulting negative electrode material expressed as a mass ratio of Co:Fe:Sn:Ti:Ag:Cu was 9.7:9.1:72.3:5.1:1.9:1.9.

Example 4

Alloy raw materials which were mixed to give a Co:Fe:Sn:Ag:Cu mass ratio of 15.0:7.0:73.4:2.3:2.3 were formed into a cast product in the form of flakes under the same conditions as for powdery alloy material A in Comparative Example 3. This cast product was pulverized using a ball mill to obtain powdery alloy material A. The duration of pulverization was set so that substantially the entirety of the cast product after pulverization could pass through a sieve with openings measuring 45 micrometers.

Alloy raw materials which were mixed to give a Fe:Sn:Ti mass ratio of 25.1:53.4:21.5 were formed into a cast product in the form of flakes under the same conditions as for powdery alloy material B in Comparative Example 3. This cast product was pulverized using a ball mill to obtain powdery alloy material B. The duration of pulverization was set so that substantially the entirety of the cast product after pulverization could pass through a sieve with openings measuring 45 micrometers.

The above-described powdery alloy material A and powdery alloy material B were weighed out so that the mass ratio of powdery alloy material A to powdery alloy material B was 77.5:22.5, then they were placed into a ball mill vessel having an inner diameter of 120 mm and mixed therein for 2 hours at 90 rpm to obtain a negative electrode material. The composition of the resulting negative electrode material expressed as a mass ratio of Co:Fe:Sn:Ti:Ag:Cu was 11.6:11.1:68.8:4.9:1.8:1.8.

Next, the negative electrode material obtained in Comparative Example 1 and the negative electrode material obtained in Example 1 were subjected to measurement by the powder X-ray diffraction method. Comparative Example 1 employed a method in which all the alloy raw materials were melted at one time and cast. This method will be referred to below as the conventional casting method. Example 1 employed a method in which the alloy raw materials were divided into two groups and each group of the alloy raw materials was separately melted and cast. This method will be referred to as the two-alloy method.

Measurement by the X-ray diffraction method was performed using a RINT1000 instrument (Cu target) manufactured by Rigaku Corporation. FIG. 1 shows the results of measurement. FIG. 1 shows 2θ(°) (θ is the Bragg reflection angle) on the abscissa and the relative strength of the diffraction lines on the ordinate. The diffraction lines were standardized using the strength of the main peak in the vicinity of 2θ=35°. By comparing the results of Comparative Example 1 and Example 1, it was ascertained that in Example 1 which used the two-alloy method, the peaks of the Sn phase which appeared in the vicinity of 2θ=30.5° and 32° were relatively low indicating that the amount of Sn phase present in the negative electrode material was decreased.

Separately, test batteries for evaluating battery properties were prepared using the above-described negative electrode materials.

First, the negative electrode materials of the above-described comparative examples and examples, natural graphite powder, and hard balls (made of SUJ steel) were prepared. The average particle diameter of the natural graphite powder was 20 micrometers. The average particle diameter means the median diameter in the particle size distribution on a volume basis. The average particle diameter can be determined using a laser diffraction particle size analyzer (Microtrack FRA made by Nikkiso Co., Ltd.). The mass ratio of hard balls:negative electrode material:natural graphite powder was 100:8.5:1.5. Initially, the negative electrode material and the natural graphite powder were thoroughly mixed. The hard balls were then added to this mixture, and the resulting mixed materials were subjected to mechanical grinding for 40 hours using a Super Misuni (NEV-MA8 manufactured by Nissin Giken Co., Ltd.) to obtain a negative electrode active material.

To the resulting negative electrode active material, acetylene black as an electrically conductive material, carboxyl methyl cellulose as a thickening agent, and styrene butadiene rubber as a binder were added. The mass ratio of the negative electrode active material:acetylene black:carboxyl methyl cellulose:styrene butadiene rubber was 75:15:5:5. These materials were kneaded to obtain a material for an electrode plate. The material for an electrode plate was applied atop a copper foil serving as a current collector, and then dried and compressed to obtain an electrode. The mass of the material for an electrode plate which was dried and compressed on the current collector was measured and made the mass of the material for an electrode plate contained in the battery.

Next, the above-described electrode and a metallic lithium foil used as a counter electrode were placed inside a coin shaped battery case. A porous insulating layer made of polyethylene was placed between the electrode and the counter electrode, and then an electrolyte solution was poured into the case. The electrolyte solution contained lithium hexafluorophosphate ($LiPF_6$) as an electrolyte and ethylene carbonate (EC) and dimethylcarbonate (DMC) as solvents. The concentration of the $LiPF_6$ salt in the electrolyte solution was 1 M, and the volume ratio of EC to DMC in the solvent was adjusted to 1:3. The battery case was then sealed to obtain a battery.

A charge/discharge test was carried out on the battery obtained by the above-described method, and the discharge capacity and the cycle-ability were evaluated. Discharge was carried out by performing constant-current discharge until a predetermined inter-electrode voltage was reached, and when the predetermined inter-electrode voltage was reached, performing constant-voltage discharge until a predetermined current density was reached. Charging was carried out by performing constant-current charging until a predetermined interelectrode voltage was reached. Charge and discharge were repeated for predetermined cycles to evaluate the discharge capacity and the cycle-ability.

The charge/discharge test was carried out at an ambient temperature of 20° C. During discharge, constant-current discharge was carried out at a current density of 1 $mA/cm^2$ until the inter-electrode voltage reached 5 mV, and after the inter-electrode voltage reached 5 mV, constant-voltage discharge was carried out at 5 mV until the current density reached 0.01 $mA/cm^2$. During charging, constant-current charging was carried out at a current density of 1 $mA/cm^2$ until the inter-electrode voltage reached 1.5 V. The integral of the current per gram of mass of the electrode plate material contained in the battery (mA/g) with respect to the discharge time (h) was recorded the discharge capacity (mAh/g).

The above-described charge/discharge test was repeated for 50 cycles, and the value of (the discharge capacity after 50 cycles)/(the discharge capacity on the first cycle)×100 was recorded as the cycle-ability.

Table 1 shows the composition of the negative electrode materials and the results of evaluation of battery properties in Comparative Examples 1-3 and Examples 1-4. Comparative Example 2 and Example 2 have the same composition in ratio of elements constituting the alloy materials and can be used to compare the conventional casting method and the two-alloy method. The results of evaluation showed that Comparative Example 2 had a discharge capacity of 452 mAh/g and a cycle-ability of 84%, while Example 2 had a discharge capacity of 523 mAh/g and a cycle-ability of 91%. Accordingly, it can be seen that the two-alloy method provides a greater discharge capacity and higher cycle properties compared to the conventional casting method. These results show that casting using the two-alloy method can manufacture a negative electrode material having superior battery properties.

Comparative Example 3 and Examples 1-4 were negative electrode materials obtained by the two-alloy method with different mass ratios of powdery alloy material A and powdery alloy material B which were mixed. From the results in Table 1, it can be seen that good cycle properties as evidenced by a cycle-ability of at least 90% are obtained when the proportion of powdery alloy material B with respect to the sum of the mass of powdery alloy material A and the mass of powdery alloy material B is at least 17 mass % and at most 24 mass %.

TABLE 1

| | Mass ratio of elements | | | | | | Casting method (Mass % of alloy material B) | Discharge capacity [mAh/g] | Cycle ability [%] |
|---|---|---|---|---|---|---|---|---|---|
| | Co | Fe | Sn | Ti | Ag | Cu | | | |
| Comparative Example 1 | 10.7 | 10.1 | 70.6 | 5 | 1.8 | 1.8 | Conventional casting | — | — |
| Comparative Example 2 | 10.5 | 9.9 | 72.3 | 3.7 | 1.8 | 1.8 | Conventional casting | 452 | 84 |
| Comparative Example 3 | 9.9 | 9.3 | 74.6 | 1.6 | 2.1 | 2.1 | Two alloy method (FeTiSn = 7.9%) | 609 | 82 |
| Example 1 | 10.7 | 10.1 | 70.5 | 4.9 | 1.9 | 1.9 | Two alloy method (FeTiSn = 23.1%) | 476 | 91 |
| Example 2 | 10.5 | 9.9 | 72.3 | 3.7 | 1.8 | 1.8 | Two alloy method (FeTiSn = 17.1%) | 523 | 91 |
| Example 3 | 9.7 | 9.1 | 72.3 | 5.1 | 1.9 | 1.9 | Two alloy method (FeTiSn = 22.5%) | 475 | 92 |
| Example 4 | 11.6 | 11.1 | 68.8 | 4.9 | 1.8 | 1.8 | Two alloy method (FeTiSn = 23.7%) | 520 | 96 |

INDUSTRIAL APPLICABILITY

A negative electrode material for a nonaqueous electrolyte secondary battery and a manufacturing method thereof according to the present invention can be used for a nonaqueous electrolyte secondary battery such as a lithium ion secondary battery.

The invention claimed is:

1. A negative electrode material for a nonaqueous electrolyte secondary battery, characterized in that:
   the negative electrode material comprises at least two types of powdery alloy materials,
   one powdery alloy material A contains Co, Sn, and Fe and does not contain Ti,
   another powdery alloy material B contains Fe, Ti, and Sn, and does not contain Co, and
   the proportion of the mass of powdery alloy material B to the sum of the mass of powdery alloy material A and the mass of powdery alloy material B is at least 10 mass % and at most 30 mass %.

2. A method of manufacturing a negative electrode material for a nonaqueous electrolyte secondary battery, comprising:

a step of preparing a powdery alloy material A containing Co, Sn, and Fe and not containing Ti, a step of preparing a powdery alloy material B containing Fe, Ti, and Sn, and not containing Co, and a step of mixing at least powdery alloy material A and powdery alloy material B so that the proportion of the mass of powdery alloy material B to the sum of the mass of powdery alloy material A and the mass of powdery alloy material B is at least 10 mass % and at most 30 mass %.

* * * * *